United States Patent
Chung et al.

(10) Patent No.: US 7,019,070 B2
(45) Date of Patent: *Mar. 28, 2006

(54) AQUEOUS COATING COMPOSITION HAVING IMPROVED ACID ETCH AND MAR RESISTANCE

(75) Inventors: Ding Yu Chung, Rochester Hills, MI (US); Peter W. Uhlianuk, Romeo, MI (US); Donald A. Paquet, Jr., Troy, MI (US)

(73) Assignee: E. I. dupont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/170,760

(22) Filed: Jun. 13, 2002

(65) Prior Publication Data

US 2003/0232920 A1 Dec. 18, 2003

(51) Int. Cl.
*C08G 18/30* (2006.01)
*C08G 18/34* (2006.01)
*C08G 18/79* (2006.01)
*C09D 175/04* (2006.01)
*C08J 3/03* (2006.01)

(52) U.S. Cl. ............... 524/591; 428/423.1; 524/839; 524/840; 525/453; 525/456; 528/49; 528/71

(58) Field of Classification Search ............. 428/423.1; 524/591, 839, 840; 525/453, 456; 528/49, 528/71
See application file for complete search history.

(56) References Cited

U.S. PATENT DOCUMENTS

| | | | |
|---|---|---|---|
| 4,591,533 A | 5/1986 | Antonelli et al. | ........... 428/520 |
| 5,521,247 A | 5/1996 | Döbler et al. | |
| 5,659,003 A * | 8/1997 | Menovcik et al. | ............ 528/73 |
| 5,698,330 A | 12/1997 | Bederke et al. | |
| 5,723,552 A * | 3/1998 | Menovcik et al. | .......... 525/453 |
| 5,747,590 A | 5/1998 | Corcoran et al. | .......... 525/155 |
| 5,827,931 A * | 10/1998 | Menovcik et al. | .......... 525/453 |

FOREIGN PATENT DOCUMENTS

| | | |
|---|---|---|
| DE | 4142816 C1 | 3/1993 |
| DE | 4410609 A1 | 9/1995 |
| WO | WO 00/55269 A1 | 9/2000 |
| WO | WO 03/022947 A1 | 3/2003 |

OTHER PUBLICATIONS

Patent Abstracts of Japan—JP 01 193367 A.

* cited by examiner

*Primary Examiner*—Rabon Sergent
(74) *Attorney, Agent, or Firm*—Steven C. Benjamin

(57) ABSTRACT

An aqueous coating composition having a pH of 6.0–10.0 comprises 30% to 70% by weight of film-forming binder and correspondingly 70% to 30% by weight of an aqueous liquid carrier for the binder; wherein the binder comprises a. 20% to 95% by weight, based on the weight of the binder, of a urethane oligomer having a weight average molecular weight of 300 to 2500 and having acid functionality and neutralized with an amine and to form a water-dispersible product; and b. 5% to 80% by weight, based on the weight of the binder, of a water-compatible alkylated melamine formaldehyde crosslinking agent;

finishes formed from the composition have good gloss and distinctness of image and excellent acid etch and mar resistance.

15 Claims, No Drawings

AQUEOUS COATING COMPOSITION HAVING IMPROVED ACID ETCH AND MAR RESISTANCE

BACKGROUND OF THE INVENTION

1. Field of the Invention

This invention is directed to coating compositions, in particular, to aqueous coating compositions having improved acid etch resistance and mar resistance and good gloss and distinctness of image.

2. Description of the Prior Art

The finishing system of choice presently being used on the exterior of automobiles and trucks comprises a clear coating applied over pigmented base coating that is applied over a primer coating. The clear coating provides protection to the pigmented base coating and improves the appearance of the overall finish, such as, gloss and distinctness of image. The clear coating also is required to have excellent acid etch resistance. Acid etching occurs when the clear coating is exposed to acid rain and other air pollutants. Further, the clear coating is required to have excellent mar resistance to withstand marring caused by commercial car washes or by other cleaning of the exterior surface of a vehicle.

Conventional waterborne clear coatings of polyester crosslinked with melamines or acid polymers crosslinked with epoxy moieties have not been able to provide the level of acid etch resistance and mar resistance that is desired by the automotive and truck industry.

It would be desirable to form a waterborne clear coating composition that provides a protective clear top coat finish that not only has good gloss and distinctness of image that provides an excellent appearance but that also has a high level of acid etch resistance and excellent mar resistance.

SUMMARY OF THE INVENTION

An aqueous coating composition having a pH of 6.0–10.0 comprises 30% to 70% by weight of film-forming binder and correspondingly 70% to 30% by weight of an aqueous liquid carrier for the binder; wherein the binder comprises
  a. 20% to 95% by weight, based on the weight of the binder, of a urethane oligomer having a weight average molecular weight of 300 to 2500 and having acid functionality and neutralized with an amine and to form a water-dispersible product; and
  b. 5% to 80% by weight, based on the weight of the binder, of a water-compatible alkylated melamine formaldehyde crosslinking agent.

DETAILED DESCRIPTION OF THE INVENTION

A typical auto or truck body is produced from a steel sheet or a plastic or a composite substrate. For example, the fenders may be of plastic or a composite and the main portion of the body of steel. If steel is used, it is first treated with an inorganic rust-proofing compound, such as, zinc or iron phosphate and then a primer coating is applied generally by electrodeposition. Typically, these electrodeposition primers are epoxy-modified resins crosslinked with a polyisocyanate and are applied by a cathodic electrodeposition process. Optionally, a primer can be applied over the electrodeposited primer, usually by spraying, to provide better appearance and/or improved adhesion of a base coating or a mono coating to the primer. A mono coating of a pigmented coating composition then can be applied but preferably, a pigmented base coating with a clear top coating then is applied to form a finish on the truck or automobile body or auto or truck part. Usually, after application, each of the coatings is cured by baking at elevated temperatures. It is generally known that a clear top coating can be applied over the base coating and both coatings cured together at an elevated temperature.

A "clear coating composition" for automotive use is a composition that forms a transparent finish upon curing and has a DOI (distinctness of image) of more than 80 and a 20° gloss of more than 80. These clear coatings provide a glossy in depth appearance to the finish on the automobile or truck and therefore, are required to have good gloss and distinctness of image. Also, the clear finish also provides acid etch resistance and mar resistance.

Particular advantages of the novel coating composition of this invention is that it provides improved acid etch resistance, i.e., provides protection against chemical surface etching caused by acid rain and also provides improved mar resistance that protects against mechanical abrasion as typically occurs during washing, particularly commercial car washing, or cleaning of the surface of a automobile or truck.

Another advantage of the novel coating composition of this invention is that it has a low VOC (volatile organic content), i.e., a VOC less than 0.24 kg/l (2 pound per gallon) and meets current governmental air pollution regulations. The novel coating composition can readily be formulated to have a VOC of less than 0.12 kg/l (1 pound per gallon). The low VOC of the composition is accomplished by stripping or removing solvent from the urethane oligomer composition and the solvent is recovered or is disposed of in some manner.

The VOC of the coating composition is determined in accordance with the procedure of EPA Method 24.

The novel composition typically has a solids content of film forming binder of 30 to 70% by weight. Since the aqueous liquid carrier, which typically is water but may contain other liquids, does not contribute to the VOC of the composition, sufficient amounts of the liquid may be added, for example, to reduce the composition to a spray viscosity or may be a portion of an additive solution, such as, a rheology control additive, without increasing the VOC of the composition.

The novel coating composition has a pH of 6.0 to 10.0 and preferably, 7.5 to 8.5. The pH may be adjusted by the addition of various amines, such as those discussed hereinafter. One particularly preferred amine is AMP (2-amino-2-methyl-1-propanol).

The urethane oligomer used in the composition is formed by reacting an aliphatic polyisocyanate with an aliphatic or cycloaliphatic monohydric alcohol and subsequently reacting the resulting composition with a hydroxy functional aliphatic carboxylic acid until all of the isocyanate groups have been reacted and then an amine is added to form a water-dispersible composition. A water-compatible (water-soluble or water-dispersible) melamine crosslinking agent is added along with a sufficient amount of an aqueous carrier liquid to provide a composition that can be applied by conventional techniques, such as, spraying or electrostatic spraying. Additional amine may be added to bring the pH of the composition within the desired range. Additional melamine that is the same as or compatible with the above melamine may be added to the novel composition to enhance crosslinking on curing after application of the composition.

One process used to form the urethane oligomer is to react an aliphatic polyisocyanate with a monohydric alcohol in the presence of a catalyst, such as, dibutyl tin dilaurate, at a temperature of 50 to 130° C. for about 2–90 minutes. Then a hydroxy functional acid, typically, a hydroxy functional carboxylic acid, such as, dimethylol propionic acid is added while maintaining the reaction temperature within the above range and the reaction is continued until all of the isocyanate has reacted. This typically occurs in about 2–4 hours. The resulting urethane oligomer has a weight average molecular weight of 300–2500. An amine is then added. The melamine crosslinking agent usually is added before the water and the reaction mixture is stirred for 0.5 to 3.0 hours at ambient temperature. Water is then added to form the coating composition.

All molecular weights disclosed herein are determined by gel permeation chromatography (GPC).

The melamine crosslinking agent does not react with urethane oligomer that has been formed until after the composition has been applied to a substrate and baked at an elevated temperature.

Examples of suitable aliphatic polyisocyanates that can be used to form the oligomer include aliphatic or cycloaliphatic di-, tri- or tetra-isocyanates, such as, 1,2-propylene diisocyanate, tetramethylene diisocyanate, 2,3-butylene diisocyanate, hexamethylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2 cyclohexane diisocyanate, 1,4 cyclohexane diisocyanate, isophorone diisocyanate, 4-methyl-1,3-diisocyanatocyclohexane, trans-vinylidene diisocyanate, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets of hexamethylene diisocyanate, allophanates, trimers and biurets of isophorone diisocyanate. One preferred polyisocyanate is the isocyanurate of hexane diisocyanate sold under the trademark Desmodur® 3300 by Bayer Corporation, Pittsburgh, Pa.

Isocyanate functional adducts can be used, such as, an adduct of an aliphatic polyisocyanate and a polyol. Any of the aforementioned polyisocyanates can be used with a polyol to form an adduct. Polyols, such as, trimethylol alkanes, particularly, trimethylol propane or ethane can be used.

Aromatic diisocyanates generally are not suitable for use in clear coating compositions since they are light sensitive and tend to yellow and crack with exposure to sunlight.

Typical monohydric alcohols that can be used to form the urethane oligomer are aliphatic and cycloaliphatic monohydric alcohols having 1–6 carbon atoms, such as, methanol, ethanol, propanol, isopropanol, butanol, isobutanol, pentanol, cyclohexanol, 2-butoxyethanol, and 2-methyoxypropanol. A small portion of polyols, such as, 1,6 hexanediol, polyethylene glycol and polypropylene glycol can also be used.

Sufficient hydroxy functional acids are used to provide the urethane oligomer with an acid number in the range of 12 to 35, preferably in the range of 10 to 45. Typical hydroxy functional acids that can be used are hydroxy acetic acid, dimethylol propionic acid, lactic acid, epsilon caproic acid, 12-hydroxy stearic acid and glycolic acid.

Sufficient amine is added to the urethane oligomer to form a water-soluble or water-dispersible product. The amine reacts with any pending carboxyl groups of the oligomer to form a salt. Typical amines that can be used include AMP (2-amino-2-methyl-1-propanol), amino ethyl propanol, dimethyl ethanol amine, N-methyl diethanol amine, diethanol amine, diglycolamine, triethylamine, hydroxy functional amines, such as, tris(hydroxymethyl) aminomethane, 2-amino-2-ethylpropanediol, and triisopropanolamine. AMP is a preferred amine. The pH of the coating composition can be adjusted with these amines. Hydroxy functional amines (disclosed above) can be used to reduce yellowing of a finish of the composition when exposed to outdoor weathering.

The coating composition contains about 5–80% by weight, based on the weight of the binder, of a water-compatible alkylated melamine crosslinking agent, preferably 20–60% by weight of an alkylated melamine crosslinking agent. Typical alkylated melamines that can be used are water-soluble or water-dispersible melamines that are monomeric or polymeric and have a relatively low molecular weight. Alkoxy monomeric melamines that can be used are low molecular weight melamines that contain on an average three or more methylol groups reacted with a monohydric alcohol having 1 to 5 carbon atoms, such as, methanol, propanol, n-butanol and isobutanol and has an average degree of polymerization of less than 2 and preferably, in the range of about 1.1 to 1.8.

Suitable monomeric melamines include highly alkylated melamines, such as, methylated melamines, methylated and butylated melamines, butylated melamines, isobutylated melamines and mixtures thereof. More particularly, hexamethoxymethylol melamine, butylated melamines and mixed methylated and butylated melamines are preferred. Particularly preferred alkylated melamines for clear coating compositions include hexamethoxymethylol melamines, such as, Cymel® 303 and Resimene® 747. Cymel® 1156 which is reported to be a 100% butylated melamine having a degree of polymerization of 2.9 also is another preferred melamine. A particularly preferred mixture of melamines is Cymel® 1156 and Resimene® CE-4514 which is reported to be a 50/50 methylated/butylated melamine.

These melamines are supplied commercially; for example, by Cytec Industries Inc. West Patterson, N.J. and by Solutia Inc., St. Louis, Mo.

Curing catalysts, are generally used in the coating composition in amounts of 0.1% to 5.0% by weight, based on the weight of the binder, for catalyzing the crosslinking of the urethane oligomer with the alkylated melamine crosslinking agent. Preferred are blocked organic sulfonic acid catalysts. Typical blocked acid catalysts include blocked paratoluene sulfonic acid, blocked dodecyl benzene sulfonic acid, blocked dinonyl naphthalene disulfonic acid in which the blocking agent is a hydroxy functional alkyl amine, such as, AMP, or dimethyl oxazolidine. In the event the composition contains an excess of amine, the acid catalyst need not be blocked and the acid form of the catalyst can be used.

An alkyl or aryl acid phosphate catalyst, such as, butyl acid phosphate or phenyl acid phosphate can be used in addition to the above acid catalysts.

The coating composition of this invention can be used as a clear coat that is applied over a pigmented base coat that may a pigmented version of the composition of this invention or another type of a pigmented base coat. The clear coating can be in solution or in dispersion form.

Typically, a clear coating is then applied over the base coating before the base coating is fully cured, a so called "wet-on-wet process", and the base coating and clear coating are then fully cured usually by baking at 100° C. to 150° C. for 15 to 45 minutes. The base coating and clear coating preferably have a dry coating thickness ranging from 2.5 to 75 microns and 25 to 100 microns, respectively.

To improve the weatherability of a clear coating, an ultraviolet light stabilizer or a combination of ultraviolet light stabilizers can be added to the clear coat composition in the amount of 0.1% to 10% by weight, based on the weight of the binder. Such stabilizers include ultraviolet light absorbers, screeners, quenchers, and specified hindered amine light stabilizers. Also, an antioxidant can be added, in the amount 0.1% to 5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference. For good durability, a blend of Tinuvin® 928 and Tinuvin® 123 (hindered amine light stabilizers), all commercially available from Ciba Specialty Chemicals, Tarrytown, N.Y. is preferred.

The clear coating composition may also include other conventional formulation additives, such as, wetting agents, leveling and flow control agents, for example, Resiflow®S (polybutylacrylate), BYK® 320 and 325 (high molecular weight polyacrylates), BYK® 347 (polyether-modified siloxane), rheology control agents, such as, fumed silica, defoamers, surfactants and emulsifiers to help stabilize the composition. Other additives that tend to improve mar resistance can be added, such as, silsesquioxanes and other silicate-based micro-particles.

The novel coating composition may be used as a base coat or as a pigmented monocoat topcoat. Both of these compositions require the presence of pigments. Typically, a pigment-to-binder ratio of 0.1/100 to 200/100 is used depending on the color and type of pigment used. The pigments are formulated into mill bases by conventional procedures, such as, grinding, sand milling, and high speed mixing. Generally, the mill base comprises pigment and a dispersant in an aqueous medium. The mill base is added in an appropriate amount to the coating composition with mixing to form a pigmented coating composition.

Any of the conventionally-used organic and inorganic pigments, such as, white pigments, like, titanium dioxide, color pigments, metallic flakes, such as, aluminum flake, special effects pigments, such as, coated mica flakes, coated aluminum flakes and the like and extender pigments can be used. It may be desirable to add one of the aforementioned UV light stabilizers and flow control additives.

The novel coating composition may be used as a primer in which case typical pigments used in primers would be added, such as, carbon black, barytes, silica, iron oxide and other pigments that are commonly used in primers in a pigment-to-binder ratio of 5/100 to 100/100.

The coating composition can further contain from 1% to 20% by weight, based on the weight of binder solids, of a water-soluble or water-dispersible polyester resin that is the esterification product of a dicarboxylic acid or anhydride, a polyol having at least three reactive hydroxyl groups, a diol, and a cyclic alcohol and having a number average molecular weight in the range of 500 to 4,000. One preferred polyester resin is the esterification product of adipic acid, trimethylol propane, hexanediol, hexahydrophthalic anhydride and cyclohexane dimethanol. Also, the coating composition can further contain from 1% to 20% by weight, based on the weight of binder solids, of a hydroxy functional acrylic resin that is water-soluble or water-dispersible. Also, the coating composition can further contain from 1% to 20% by weight, based on the weight of binder solids, of one of the aforementioned polyalkylene ether glycols which act as a reactive diluent that reacts with the alkylated melamine and becomes part of the film-forming constituent of the coating composition. Polypropylene ether glycols, such as, PPG 425 and PPG 1025 are preferred since these glycols reduce the water sensitivity of the resulting coating. The coating composition may contain 1–40% by weight of a polyurethane resin that is water-soluble or water-dispersible.

Other catalysts that can be used to improve the cure rate of the composition, include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, and other such catalysts or mixtures thereof known to those skilled in the art.

To improve, for example, application properties, such as, flow or leveling, it may be necessary to add small amounts of conventional organic solvents that are commonly used in coating compositions. Typically, such solvents should be in small amounts and only increase the VOC of the coating composition to about 0.025–0.010 kg/l.

The coating composition can be applied by conventional techniques, such as, spraying, electrostatic spraying, dipping, brushing, and flow coating.

Testing Procedures Used in the Examples

20° Gloss—test method ASTM D523—a rating of at least 80 is an acceptable minimum.

DOI—distinctness of image—test method ASTM D5767—a rating of at least 80 is an acceptable minimum.

Hardness—Tukon Hardness—test method ASTM D1474.

Dry Mar Resistance

The clear coating of the panel was coated with a thin layer of Bon Ami abrasive supplied by Faultless Starch/Bon Ami Corporation, Kansas City, Mo. The panels were then tested for mar damage by applying 10 double rubs against a green felt wrapped fingertip of A.A.T.C.C. Crockmeter (Model CM-1, Atlas Electric Devices Corporation, Chicago, Ill.). The dry mar resistance was recorded as percentage of gloss retention by measuring the 20° gloss of the mar areas versus the non-marred areas of the coated panels.

Wet Mar Resistance

Similar procedure was used as above except that a wet alumina slurry was used instead of the Bon Ami abrasive. The alumina slurry consisted of 294 parts deionized water, 21 parts ASE-60 Thickener, 25 parts AMP 95% aqueous solution of amino methyl propanol and 7 parts of aluminum oxide (120# grit)

Acid Etch Resistance Test 10.16×30.48 cm (4×12 inches) primed steel panels coated with a black waterborne polyester-modified acrylic melamine base coating was sprayed with a clear coating composition prepared in the Example and cured for 30 minutes at 140° C. The resulting panel was tested on a Byk Gradient oven, programmed with a temperature gradient that is 40° C. at the bottom of the gradient and 90° C. at the top of the gradient. Drops of a synthetic rain are placed on the panel at 5° C. intervals. The synthetic rain is a mixture of 100 parts by weight of an aqueous cationic solution of ammonium hydroxide, calcium hydroxide, sodium hydroxide and potassium hydroxide and 33 parts by weight of an aqueous anionic solution of sulfuric acid, nitric acid and hydrochloric acid and the resulting mixture has a pH of 1. The panels reside in the gradient oven for 30 minutes and then are rinsed with water. The degree of damage at each spot where the synthetic rain was dropped is evaluated vs. a control clear coating composition. The control clear coating composition is a one-component commercial acrylosilane coating composition (Gen® IVAW from DuPont). The performance of the clear coating under test is judged by the accumulated degree of damage that occurs over the entire gradient. The damage scale is 0–10 with 10 being the most damage. The commercial clear coating composition (control) has a degree of damage of 6 and any acceptable clear coating composition must have a degree of damage of 6 or less.

The following examples illustrate the invention. All parts and percentages are on a weight basis unless otherwise indicated. Molecular weights are determined by GPC (Gel Permeation Chromatography) using polymethyl methacrylate as the standard.

EXAMPLE

Preparation of the Urethane Oligomer Containing Acid 479 parts of methyl isobutyl ketone, 1164 parts of isocyanurate of hexanediisocyanate (Desmodur®3300 from Bayer), and 0.15 part of dibutyltindilaurate were charged into a reactor under a nitrogen blanket. 401 parts of cyclohexanol were added to the reactor through dropping funnel over 30 minutes. The resulting reaction mixture was held at 120° C. for 45 minutes and then cooled to 70° C. 134 parts of dimethylolpropionic acid were added and the reaction mixture was held at 75° C. until all NCO was reacted.

Preparation of the Clearcoat Composition

The following components were charged into a mixing vessel and mixed together: 116.7 parts Resimene® 4514 (methylated-butylated melamine from Solutia), 30.8 parts (60% non-volatile) non-aqueous dispersion (prepared in accordance with the U.S. Pat. No. 5,747,590 at column 8, lines 46–68 and column 9, lines 1–25), 5.3 parts Tinuvin® 928 (UV absorber), 160.2 parts the urethane oligomer containing acid prepared above, 6.2 parts aminomethylpropanol, 4.4 parts of antifoaming agent Byk® 011, and 0.5 part of anti-cratering agent Byk® 348. To this mixture, 463.4 parts of deionized water was added slowly to form an emulsion. The emulsion was vacuum distillated to remove organic solvents. To the solvent-free emulsion, 7.8 parts amine blocked dodecylbenzenesulfonic acid and 4.6 parts of mineral spirits were added. The emulsion was adjusted with deionized water to 50 seconds viscosity by Ford #4 cup for spray application.

The above prepared clear coating composition was applied by spraying as a clear coat onto a phosphatized steel panel coated with a cured cathodic epoxy resin based electrodeposition primer over which a black pigmented waterborne base coating composition of an acrylic polymer crosslinked with a melamine resin was applied to a wet film thickness of 12.7–20.32 microns (0.5–0.8 mils), flash dried for 5 minutes and baked for 10 minutes at 82° C. (180° F.). The above prepared clear coating was applied to a wet film thickness of 43.2–48.26 microns (1.7–1.9) mils and baked for 30 minutes at 140° C. (285° F.).

A control was prepared using the same phosphatized steel panel coated with a cured cathodic epoxy resin based electrodeposition primer over which a black pigmented waterborne base coating composition of an acrylic polymer crosslinked with a melamine resin was applied to the same wet film thickness and flash dried and baked as above and then a conventional commercially-available acryosilane clear coating composition (Gen® IVAW from DuPont) was applied and baked as above to provide a clear coat film on the panel (Panel B).

The following test were conducted on each of the panels and the results of these test are shown in the following Table 1:

TABLE 1

| | RESULTS | |
|---|---|---|
| TEST | Panel A (invention) | Panel B (control) |
| 20° Gloss | 96 | 87 |
| DOI | 97 | 95 |
| HARDNESS (Tukon Hardness knoops) | 17.1 | 4.7 |
| Dry Mar Resistance (% gloss retention) | 90% | 80% |
| Wet Mar Resistance (% gloss retention) | 85% | 67% |
| Acid Etch Resistance (Synthetic rain etch data) | 5 | 6 |

The clear coating on Panel A, the invention, showed an improvement in 20° Gloss and DOI and a significant improvement in Hardness, Dry Mar Resistance and Wet Mar Resistance in comparison to the control of a conventional commercial acrylosilane containing clear coating composition (Gen® IVAW from DuPont) that is used on automobiles and trucks. Acid etch data showed a small improvement of Panel A, the invention, in comparison to the control.

What is claimed is:

1. An aqueous coating composition having a pH of 6.0–10 and comprising 30% to 70% by weight of film-forming binder and correspondingly 70% to 30% by weight of an aqueous liquid carrier for the binder; wherein the binder comprises
   a. 20% to 95% by weight, based on the weight of the binder, of a urethane oligomer having a weight average molecular weight of 300–2500 consisting of the reaction product of an aliphatic polyisocyanate, a hydroxy functional aliphatic carboxylic acid and a monohydric alcohol selected from the group consisting of aliphatic monohydric alcohol and cycloaliphatic monohydric alcohol, wherein the acid groups formed thereon are neutralized with an amine to provide a water-dispersible product; and
   b. 5% to 80% by weight, based on the weight of the binder, of a water-soluble or water-dispersible alkylated melamine crosslinking agent.

2. The coating composition of claim 1 containing 0.1 to 5.0% by weight, based on the weight of the binder, of a blocked acid catalyst.

3. The coating composition of claim 2 in which the blocked acid catalyst comprises an organic sulfonic acid blocked with an amine.

4. The coating composition of claim 1 in which the crosslinking agent is selected from the group consisting of a monomeric hexamethoxymethylol melamine, a mixed methylated and butylated melamine, butylated melamine and isobutylated melamine.

5. The coating composition of claim 1 in which the aliphatic polyisocyanate is the isocyanurate of hexamethylene diisocyanate.

6. The coating composition of claim 1 in which the monohydric alcohol is cyclohexanol.

7. The coating composition of claim 1 in which the hydroxy functional aliphatic carboxylic acid is dimethylol propionic acid.

8. The coating composition of claim 1 in which the amine is amino methyl propanol.

9. The coating composition of claim 1 containing pigments dispersed therein thereby having a pigment to binder weight ratio of 0.1/100 to 200/100.

10. The coating composition of claim 1 which contains about 0.1% to 10% by weight, based on the weight of the binder, of ultraviolet light stabilizers.

11. The coating composition of claim 1 useful as a clear coating composition in which the urethane oligomer consists of the reaction product of the isocyanurate of hexane diisocyanate, cyclohexanol, dimethylol propionic acid, and the amine comprises amino methyl propanol and the composition contains 0.1 to 5% by weight, based on the weight of the binder, of a blocked organic sulfonic acid catalyst wherein the blocking agent is aminomethyl propanol and the alkylated melamine crosslinking agent comprises a mixed methylated and butylated melamine, and the composition also contains about 0.1% to 10% by weight, based on the weight of the binder, of ultraviolet light stabilizers.

12. The coating composition of claim 1 useful as a primer composition containing pigment in a pigment to binder ratio of 5/100 to 100/100 in which the urethane oligomer consists of the reaction product of the isocyanurate of hexane diisocyanate, cyclohexanol, dimethylol propionic acid, and the amine comprises amino methyl propanol and the composition contains 0.1 to 5% by weight based on the weight of the binder, of a blocked organic sulfonic acid catalyst wherein the blocking agent is amino methyl propanol and the alkylated melamine crosslinking agent comprises a mixed methylated and butylated melamine.

13. A substrate coated with the composition of claim 1.

14. A substrate having a base coating of a pigmented coating composition, which is top coated with a clear coating of the composition of claim 1.

15. A substrate having a multi-layer coating comprising a pigmented primer coating of the composition of claim 1, a base coating of a pigmented coating composition, and a top-coating of a clear coating of the composition of claim 1.

\* \* \* \* \*